3,077,133
TAPE DISPENSING APPARATUS WHEREIN OSCILLATION OF THE CUTTER ASSEMBLY CAUSES RECIPROCATION OF THE CUTTING BLADE
Harris F. Hanscom, Barrington, R.I., assignor to H. F. Hanscom & Company, Inc., a corporation of Rhode Island
Filed Jan. 27, 1961, Ser. No. 85,348
2 Claims. (Cl. 83—308)

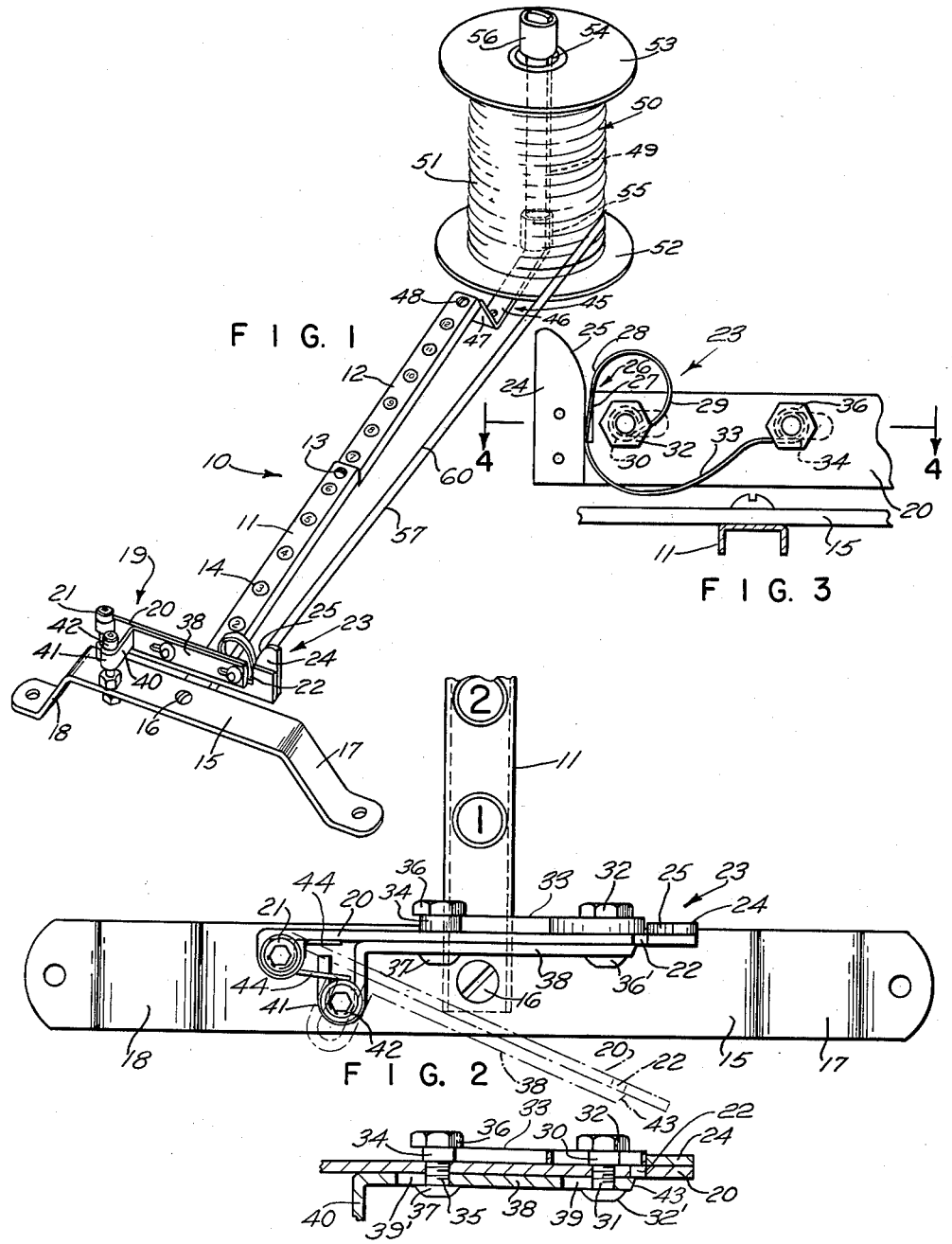

This invention relates to the dispensing of tape and has to do with both the method of dispensing and a device for accomplishing the dispensing by the improved method.

One of the most familiar devices for dispensing tape is that used for adhesive coated tape in which the tape is drawn from a supply roll and then at the desired location the tape is drawn over a fixed cutter. This form of dispensing, however, is of no avail where a tape of the type having a reinforced wire core is utilized as the severing cannot be accomplished by any such manual operation.

One of the objects of this invention is to provide a positive cutting off means for a wire reinforced tape or the like.

Another object of this invention is to provide a device upon which a supply spool may be mounted and which will have a cutoff device at a location spaced therefrom with a base extending between the supply and the cutter which has graduations or some marking indicator upon its outer surface which will serve as a means for measuring the length of tape to be cut off.

Another object of this invention is to provide a device and a method of cutting the tape which will permit the tape being grasped at a point just forward of the location to be cut and moving the grasped location to a point on the opposite side of the cutter from the supply source and then inserting the tape into the cutter and by a continued forward movement cause the cutter to be actuated and the tape severed, whereby the point of grip having once been taken on the tape remains at this location during the maneuvering of the tape while attached to the supply and also on the cutoff strip which is severed from the supply.

Another object of the invention is to provide a cutting device into which the tape may be inserted and then moved forwardly so as to cause a severing of the tape by a powerful mechanical action.

Another object of the invention is to provide a simple and yet effective holding means which may be carried by the cutter and which may grip the tape to prevent slipping therethrough.

With these and other objects in view, the invention consists of certain novel features of construction as will be more fully described and particularly pointed out in the appended claims.

In the accompanying drawings:

FIGURE 1 is a perspective view of the device showing a spool of tape assembled thereon and a portion of the tape extending up to the gripping means which is a part of the cutter assembly;

FIGURE 2 is a top plan view of the forward portion of the device on a somewhat larger scale and illustrating in broken lines the cutting position of the cutter;

FIGURE 3 is a fragmental view looking at the opposite side of the cutter assembly from that shown in FIGURE 1; and FIGURE 4 is a section on line 4—4 of FIGURE 3.

In proceeding with this invention, I have provided a base which carries graduations on its obverse surface. At the forward end of this base there is mounted a cutter assembly consisting of a fixed cutting jaw and a movable cutting jaw and a gripping means, the arrangement being such that when the cutter assembly is swung about its pivot, the movable cutter will be actuated to sever a piece a tape held by the gripping means. A supply for the tape is conveniently mounted upon the base at a location spaced from the cutter.

With reference to the drawings 10 designates the base of the device which is formed of a forward section 11 and a section 12 just to the rear thereof. These sections are secured together by interfitting means held by screw 13. Additional sections may be added as occasion may require. Markings 14 appear on the surface of each of the sections which in this instance indicate inches and may extend in the desired length depending upon the number of sections utilized. A platform 15 is secured at the forward end of the section 11 by screw 16 and has legs 17 and 18 to space it from a support surface and also serve as a mounting for a cutter assembly designated generally 19.

The cutter assembly comprises a bar 20, pivoted on post 21 which extend generally vertically from the platform 15. The bar 20 thus will swing in a horizontal plane about this post as a pivot. This bar is notched as at 22 in a size sufficient to receive a piece of tape to be cut. On the rear side of this bar there is a holding device designated generally 23 which comprises a fixed jaw 24 having a flared upper edge 25 and a movable jaw 26 formed from a resilient piece of ribbon stock 33 bent into the shape best shown in FIGURE 3. This shape provides the gripping portion 27 flared as at 28 and continuing in an arcuate form as at 29 and then rolled into eye 30 which is secured in position by a bolt 31 and nut 32 (see FIGURE 4), the eye extending about the bolt. This bolt is threaded into the bar and held in position by tightly bringing up the nut 32 against the eye 30 of this resilient jaw. On the other side of the gripping portion 26 of this holding means, the resilient stock 33 extends in a large arc to a location spaced from the bolt 31 and there ends in an eye 34 which is secured by a bolt 35 threaded through the bar 20 and a nut 36 which clamps this eye 34 against the bar while leaving its head portion 37 spaced therefrom. Likewise the head portion 32' of the bolt 31 is spaced from the bar. In this manner the resilient holding jaw 26 moves toward and from the fixed jaw 24 while maintaining a position generally parallel thereto so as to firmly grip the tape which is positioned between the jaws by being moved downwardly through the flaring mouth portions 25 and 28 of this gripping means.

On the forward side of the bar 20 there is located a cutting blade 38 which is slotted as at 39 and 39' to slidably mount upon the bolts 31 and 35, the heads of the bolts, 32' and 37, causing the blade 38 to bear against the forward side of the bar 20 in its movement. This blade 38 is provided with a right angular extending arm 40 which is rolled into an eye 41 and receives a pivot post or abutment 42 which is vertically mounted on the platform 15. This post 42 is at a location somewhat forwardly from the pivot post 21, and by reason of this location, when the cutter assembly consisting of the bar 20, the gripping means 23 and this cutter 38 are swung from a position at right angles to the general extent of the base 10, the cutter 38 will slide along the bar 20 so that its cutting edge 43 will move across the opening 22 in the bar 20 and serve to sever the tape which may be positioned in the notch 22. To return the cutter assembly to a normal rest position, spring means 44 is provided and is shown as comprising a coil spring formed around post 21 and having one end bearing against the front side of bar 20, the other end bearing against post 42.

At the other end of the base 10 and attached to the rear end of section 12, there is a tape supply support 45 consisting of a foot portion 46 which has an upstanding leg 47 attached to the rear end of section 12 by screw 48 and which may similarly attach to another section should it be added to the line of the base. A vertical post 49 rises upwardly from the foot portion 46 and is of a size to mount a spool 50. The spool may be of any suitable construction for holding tape 51 thereon and is illustrated as having spool ends 52 and 53, each end having an opening 54 to receive the post 49 and maintain the spool in position. In order to provide rotative friction for the spool, a rubber sleeve 55 may be positioned at the lower end of the post 49 which extends into the opening 54, while an upper rubber sleeve 56 may be inserted in the upper end of the spool and about the post 49 and in opening 54. These sleeves not only serve to properly align the spool with the post, but also to provide a friction drag on the tape being unwound therefrom. The tape extends from the spool as shown at 57 to a position to be inserted in the gripping means 23 carried by the cutter assembly.

In use, if it is desired to cut off a length of tape eight inches long, the thumb and finger of one hand will grasp the tape at the point opposite the numeral 8 and at a location designated as 60 on the tape. Then a slight movement of the tape away from the gripping means 23 removes the tape therefrom. The thumb and forefinger then bring the tape forwardly so that the fingers are immediately to the front side of the cutter assembly and the tape is placed into notch 22 and gripping means 23. Without losing a grip on the tape, further forward movement will draw further tape from the spool, and since the tape is gripped at 23, the cutter assembly will swing about its pivot from the position shown in full lines in FIGURE 2 to the position shown in broken lines. This causes the cutting blade 38 to move across the notch 22, thus severing the tape from the supply and leaving the end of the supply gripped by the holding means 23. The spring 44 returns the cutter assembly to rest position. In this manner the tape which has been severed is still in the hand which originally gripped it. Accordingly, it is not necessary to grip the tape at a second location or a second time, and the entire operation may be done with one hand by gripping, lifting, sliding the tape into the slot and then drawing forward in a single upward-forward, downward-forward, continued movement.

The tapes are used for twisting or wrapping about items to be bound together, and the accuracy provided by this device is such that an accuracy of better than ⅛ inch may be attained after repetitive operations, which is a figure entirely satisfactory for commercial use.

I claim:

1. In a tape dispensing machine, a movably mounted cutter assembly having a fixed bar and a reciprocating blade and a mounting platform, a post extending vertically from said platform, said fixed bar being pivoted about said post and having a notch therein, said blade mounted on said bar for reciprocation across said notch, tape holding means within said notch, abutment means on said platform adapted to contact said blade, a source of tape remote from said cutter assembly whereby said tape may be inserted in said notch and said assembly pivoted about said post whereby the blade will strike said abutment causing reciprocation across said notch and resultant cutting of said tape.

2. In a tape dispensing machine as in claim 1 wherein said abutment is a member spaced from but adjacent to said post and a portion of said bar encircles said member.

References Cited in the file of this patent

UNITED STATES PATENTS

| | | |
|---|---|---|
| 1,462,871 | Rosenberg | July 24, 1923 |
| 1,959,294 | Phillips | May 15, 1934 |
| 2,447,145 | Van Cleef | Aug. 17, 1948 |
| 2,509,641 | Hillmer | May 30, 1950 |
| 2,518,069 | Roper | Aug. 8, 1950 |
| 2,747,664 | Corson | May 29, 1956 |
| 2,946,381 | Lisinski | July 26, 1960 |